United States Patent [19]

Nakazawa et al.

[11] Patent Number: 4,840,755

[45] Date of Patent: Jun. 20, 1989

[54] METHOD OF AND APPARATUS FOR PRODUCING COMPACTED CHOPPED STRANDS

[75] Inventors: Kogi Nakazawa; Toshihito Fujita, both of Fukushima, Japan

[73] Assignee: Nitto Boseki Co., Ltd., Fukushima, Japan

[21] Appl. No.: 245,932

[22] Filed: Sep. 14, 1988

Related U.S. Application Data

[63] Continuation of Ser. No. 895,587, Aug. 13, 1986, abandoned, which is a continuation of Ser. No. 647,855, Sep. 4, 1984, abandoned, which is a continuation of Ser. No. 426,199, Sep. 28, 1982, abandoned.

[30] Foreign Application Priority Data

Nov. 27, 1981 [JP]  Japan ............................. 56-190162
Feb. 12, 1982 [JP]  Japan ............................. 57-20711
Mar. 19, 1982 [JP]  Japan ............................. 57-43900

[51] Int. Cl.$^4$ ............................................ C03B 37/01
[52] U.S. Cl. ........................................ 264/15; 65/2;
    65/3.1; 65/10.2; 264/69; 264/143; 264/210.8;
    264/37; 425/297; 425/305.1; 425/332
[58] Field of Search ................. 264/6, 9, 15, 69, 70,
    264/112, 113, 118, 143, 210.8, DIG. 53, 115, 37;
    65/10.2, 2, 9, 11.1, 3.1; 425/332, 333, 222, 297,
    305.1; 156/244; 427/289; 428/361, 378, 392,
    401; 19/0.3, 0.6, 305, 306

[56] References Cited

U.S. PATENT DOCUMENTS

| | | | |
|---|---|---|---|
| 1,969,589 | 8/1934 | Tanzi | 425/332 |
| 2,553,714 | 5/1951 | Lucas | 425/222 |
| 2,696,639 | 12/1954 | Meyer et al. | 264/70 |
| 2,995,773 | 8/1961 | Gidlow et al. | 264/70 |
| 3,006,291 | 10/1961 | De Aquino Montsz | 425/332 |
| 3,024,150 | 3/1962 | Urbanetti | 264/70 |
| 3,153,107 | 10/1964 | Cole | 264/87 |
| 3,403,069 | 9/1968 | Benson | 264/DIG. 53 |
| 3,650,651 | 3/1972 | Turner | 264/69 |
| 3,703,564 | 11/1972 | White | 260/860 |
| 3,869,268 | 3/1975 | Briar et al. | 65/2 |
| 3,890,072 | 6/1975 | Barks | 425/332 |
| 3,996,032 | 12/1976 | McWilliams et al. | 65/3.4 |
| 4,025,273 | 5/1977 | Mauer et al. | 425/332 |
| 4,071,340 | 1/1978 | Melle | 65/10.2 |
| 4,086,313 | 4/1978 | Axer et al. | 264/70 |
| 4,111,744 | 9/1978 | Reiniger | 162/100 |
| 4,145,202 | 3/1979 | Grodin et al. | 65/2 |
| 4,158,555 | 6/1979 | Kallenborn | 65/2 |
| 4,359,445 | 11/1982 | Kane et al. | 264/210.8 |

OTHER PUBLICATIONS

Handbook of Chemical Engineering (4th Rev., 1978), pp. 693, 732–747.
Encylopedia of Powder Process Industry and Technology (1974), Data Section, pp. 9-14–9-15.
Encyclopedia of Powder Process Industry and Technology (1974), Fundamental Technology Section), pp. 150–151.

Primary Examiner—Jan H. Silbaugh
Assistant Examiner—MaryLynn Fertig
Attorney, Agent, or Firm—Bert Lewen; Henry Sternberg

[57] ABSTRACT

A method of and an apparatus for producing compacted chopped strands having a high density, wherein flattened wetted chopped strands are prepared and subjected in the wetted state to a rolling action to change the flattened form into rounded rod-like form while being compacted. The chopped strands are conveyed horizontally along a vibrating carrier plate (44, 151, 151') so that the rolling action is imparted to the chopped strands during the convey. The chopped strands moving among the carrier plate (151, 151') is dried by heated air applied from the lower side of the chopped strands.

16 Claims, 5 Drawing Sheets

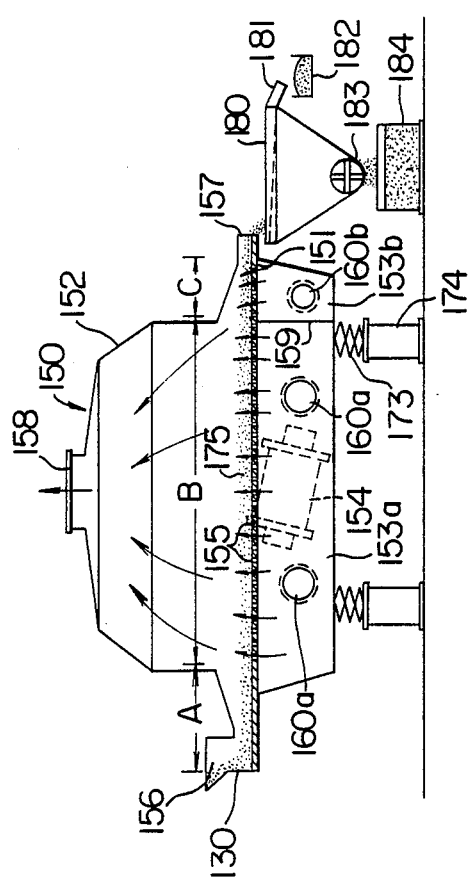
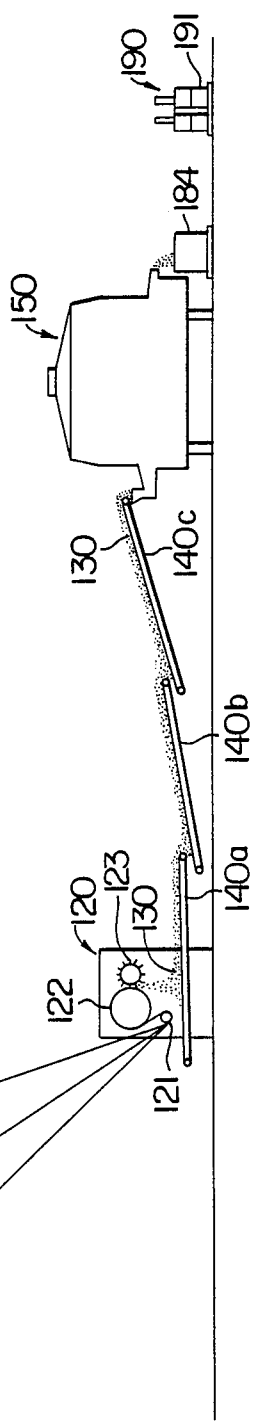
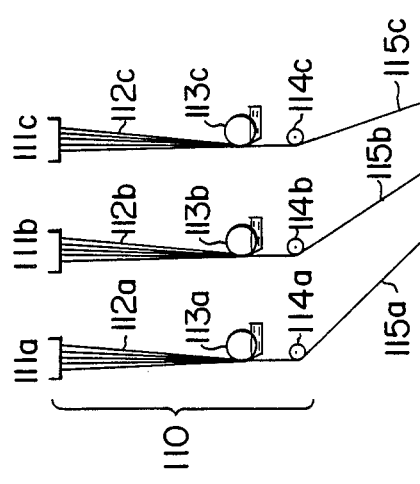
FIG. 7
FIG. 6

METHOD OF AND APPARATUS FOR PRODUCING COMPACTED CHOPPED STRANDS

This is a continuation of co-pending application Ser. No. 895,587, filed Aug. 13, 1986, which in turn is a continuation of Ser. No. 647,855, filed on Sept. 4, 1984, which in turn is a continuation of Ser. No. 426,199, filed on Sept. 28, 1982, all now abandoned.

BACKGROUND OF THE INVENTION

The present invention relates to a method of and apparatus for producing compacted chopped strands of high density. More particularly, the invention is concerned with a method of and apparatus for producing a substantially rod-shaped compacted chopped strands from chopped strands having generally flat shape obtained by cutting a strand of long fiber such as glass fiber strand or a roving of the same.

In recent years, glass-fiber reinforced thermoplastic materials are finding spreading use as the materials of parts which are required to have high mechanical strength.

Various methods have been known as the method of producing articles from such glass-fiber reinforced thermoplastic materials.

According to one of these known methods, a mixture of pellets of a thermoplastic resin and chopped strands of glass fibers pelletized by an extruder, and the pellets thus formed containing glass fibers are then formed into an article by an injection molding machine. According to another known method, the mixture of the chopped strands of glass fiber and resin pellets is directly supplied to an injection molding machine and formed into the article.

In these methods, the unity or integrality of the chopped strands is an important factor which largely affects various process characteristics and formability in the steps of preparing the mixture of the resin pellets and chopped strand, as well as in the final forming step, and also various physical properties of the formed article. Namely, any cracking, napping and separation of the chopped strands in these steps not only deteriorate the process characteristics and formability in such steps but also makes it difficult to achieve various strength characteristics and other physical properties such as homogeneity of the formed article.

On the other hand, there is a trend for labor saving, rationalization and systematization in the field of production of glass-fiber reinforced thermoplastic articles. This in turn requires a certain change in the form of chopped strands of glass fibers. Namely, hitherto, the fiber length of glass fibers for the production of glass-fiber reinforced thermoplastic generally ranged between 3 and 6 mm but, recently, there is an increasing demand for shorter chopped strands of, for example, 1 to 3 mm and having a higher integrality and density, in order to meet the operation characteristics and to make full use of abilities of machines such as automatic weighing machine, air conveyor and so forth which are used to comply with the request for the labor saving, rationalization and systematization. It is to be noted also that there is an increasing requirements for homogenization and smoothing of the glass-fiber reinforced thermoplastic articles themselves, as the use of such articles spreads to the field of small-sized parts. The demand for shorter and denser chopped strands is accelerated also by these requirements.

In this connection, the conventional chopped strands suffer a vital problem. Namely, according to the prior art, the chopped strands are produced to have flat form due to the characteristics of the forming process and the requirement by cutting method, and this flat form considerably deteriorates the process characteristics in the automatic weighing and air conveying, as well as formability. More specifically, in the ordinal glass fiber forming method, glass filaments are drawn from a bushing or orifice plate of a spinning furnace, gathered into strands and taken up on bobbins with large tension which is required to form filaments and to overcome the frictional force caused by contacting a sizing applicator, gathering shoes, traverse and so forth, so that the strands wound on the bobbins inevitably have flattened cross-section. The taken-up strands are dried into cakes. The strand of dried cake is cut into chopped strands. Immediately before the cutting, an aqueous coating agent or lubricant is applied to the cake. Such steps, however, do not substantially change the flat configuration of the strands. The same applies also to the case where undried cake is cut directly or the case where an aqueous sizing agent is secondarily applied to the undried cake before the cutting.

There has been known another chopped strands forming method, referred to as a direct cut type, in which strands from a spinning furnace are directly supplied to a cutter and cut into chopped strands. In this case, the fiber drawing tension is produced by the adhesion of the strand to a peripheral surface of a feed roller of the cutter, and the fiber is inevitably flattened on the feed roller. In consequence, the chopped strand naturally has a flat configuration. Such strands having flat cross-section have large surface area and are generally bulky as a whole. In consequence, the process characteristics in the automatic weighing and air conveying in the forming process, and also the process characteristics in the step of preparation of mixture with resin pellets, are deteriorated undesirably. Furthermore, the flattened cross-sectional shape of the strand inherently reduces the resistance against external mechanical force, to undesirably increase the tendency of napping, cracking and separation to further deteriorate the process characteristics and formability.

The chopped strand is formed by gathering a large number of filaments, e.g. 800 to 2,000 filaments, into a strand and then cutting the strand into chopped strands of a predetermined length. The shorter length of the chopped strands increases the cutting impact force exerted by the cutter in relation to the binding force. The resistance of the chopped strand against the mechanical external force is reduced also by this reason.

SUMMARY OF THE INVENTION

Accordingly, an object of the invention is to provide a method of and apparatus for producing compacted chopped strands which have higher density and, hence, higher unity and greater strength against external mechanical force as compared with conventional chopped strands having flattened cross-section.

To this end, according to one aspect of the invention, there is provided a method of producing compacted chopped strand having the steps of preparing flattened chopped strands and subjecting the flattened strands to a rolling action in wetted state thereby to compact the chopped strand.

According to another aspect of the invention, there is provided an apparatus for producing compacted chopped strands comprising a rolling apparatus having an inlet for receiving wetted chopped strands, a rolling means for imparting rolling action to said wetted chopped strands thereby to compact said wetted chopped strands, and an outlet for discharging the treated chopped strands.

According to a preferred embodiment of the invention, rolling action is imparted to the flattened chopped strands by vibrating a carrier plate carrying the chopped strands so that the flattened chopped strands are changed into substantially rod-shaped strands.

According to another preferred embodiment of the invention, wetted flattened chopped strands are conveyed in the form of layer or bed while being vibrated by a vibration of a carrier plate carrying the strands, and at a predetermined region in the middle of the convey, heated air is applied to the flowing bed of the chopped strand from the lower side, so that the chopped strands are compacted and then dried during the convey. Since the heated air is applied from the lower side of the bed of the chopped strands which are being vibrated and conveyed, the heated air can efficiently flow through the bed of the chopped strands to effect quite a prompt and efficient drying of the chopped strands. In addition, the heated air removes and carries away the naps or separated fibers in the bed of the chopped strands so that chopped strands with minimum naps and separation of fibers and, hence, exhibiting superior unity are obtained as the final product.

According to still another preferred embodiment of the invention, cooling air is applied from the lower side of the moving bed of the chopped strands which are being vibrated and conveyed, at the downstream side of the region of application of the heated air, so that the chopped strands are cooled rapidly.

BRIEF DESCRIPTION OF THE DRAWINGS

FIG. 6 is a schematic sectional view of another embodiment of the invention;

FIG. 7 is a sectional side elevational view of a spheroidizing and drying apparatus incorporated in the embodiment shown in FIG. 6;

DETAILED DESCRIPTION OF THE PREFERRED EMBODIMENTS:

Preferred embodiments of the invention will be described hereinunder with reference to the accompanying drawings.

Figure 1:
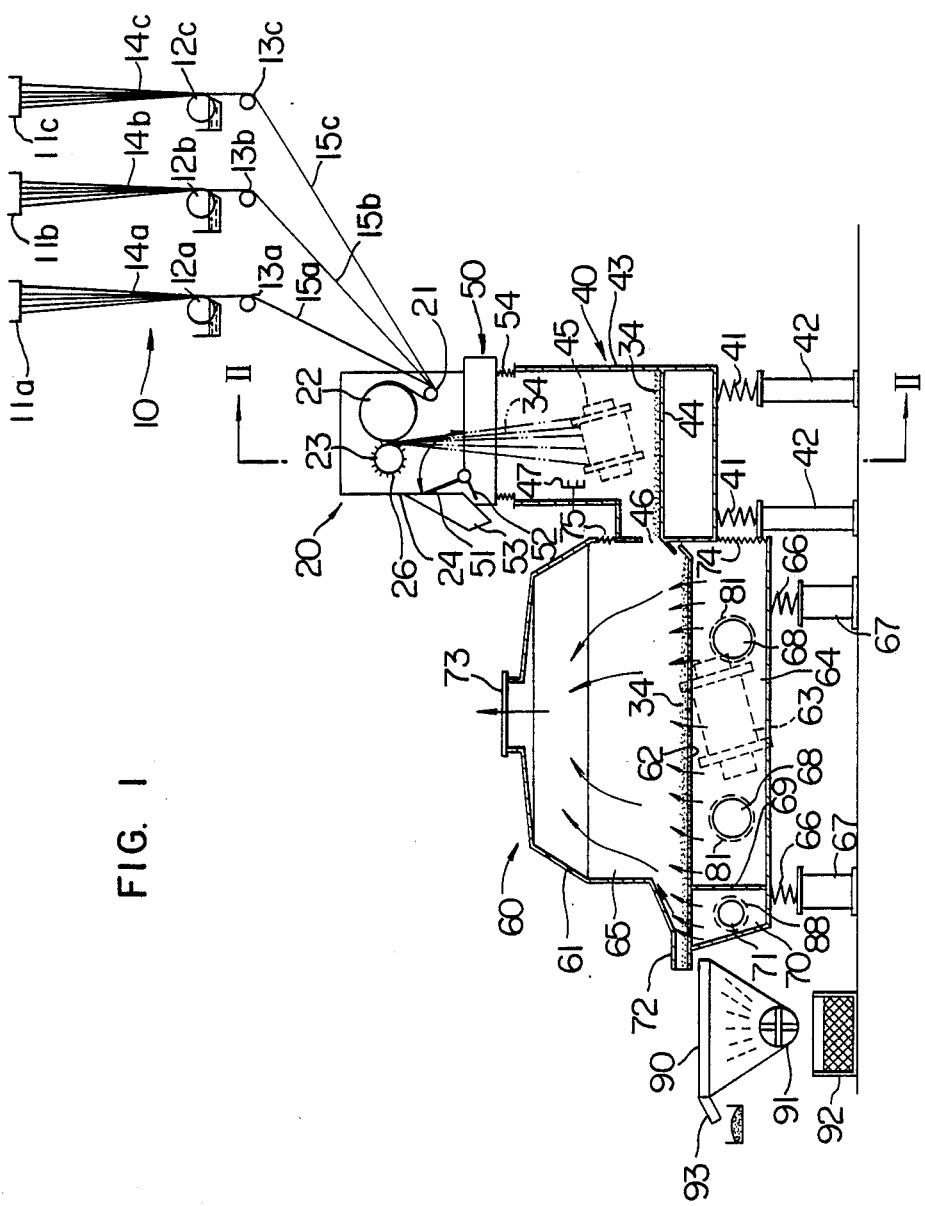
FIG. 1 is a schematic sectional view of an embodiment of the invention.
Figure 2:
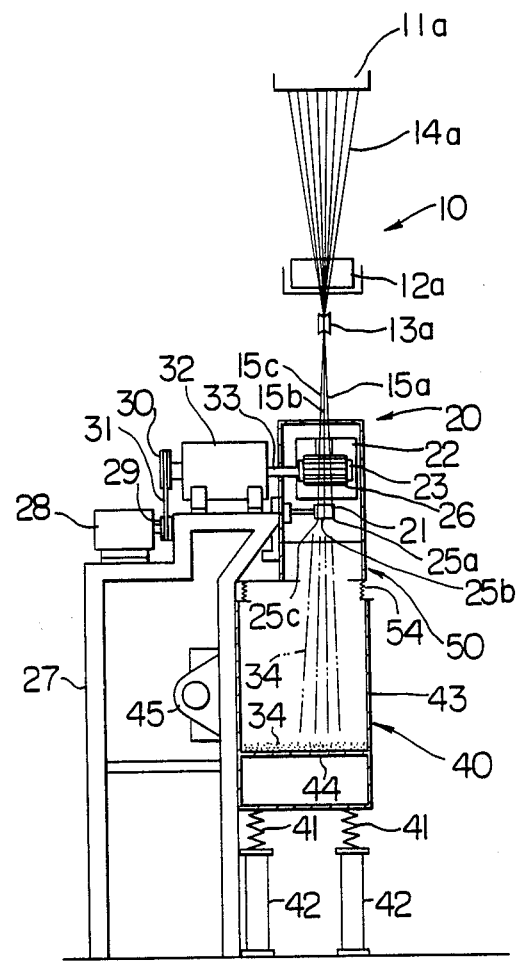
FIG. 2 is a sectional view taken along the line II—II of FIG. 1.
Figure 3:
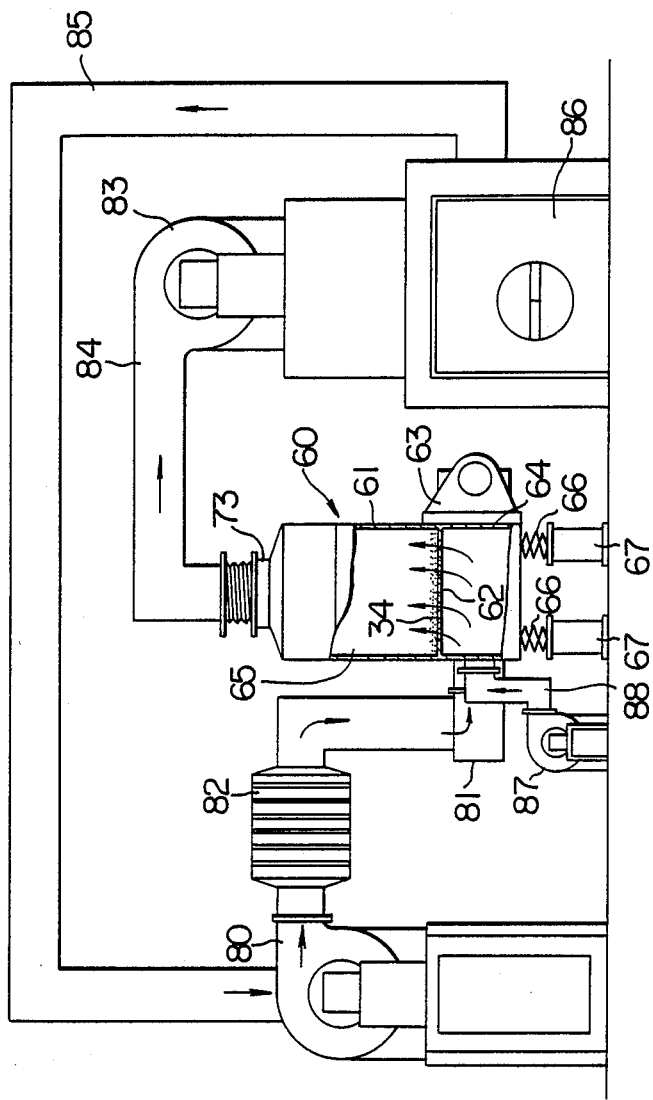
FIG. 3 is a partly-sectioned side elevational view of a drying apparatus incorporated in the embodiment shown in FIG. 1 shown together with the gas supplying and discharging systems.

FIGS. 1 to 3 show a direct-cut type chopped strands producing apparatus in which the present invention is embodied. In these Figures, a reference numeral 10 designates a spinning machine under which disposed are a cutting device 20, rolling device 40, drying device 60 and sorting and packing device.

The spinning machine 10 has spinning furnaces 11a, 11b, 11c, sizing applicators 12a, 12b, 12c and gathering rolls 13a, 13b, 13c. The filament groups 14a, 14b, 14c spun out from respective spinning furnaces 11a, 11b, 11c are applied with ordinary sizing material containing a coating agent and lubricant by respective applicators 12a, 12b, 12c and are converged into independent single strands 15a, 15b, 15c by the gathering rolls 13a, 13b, 13c. The strands 15a, 15b, 15c in the wetted state are then introduced into the cutting device.

The cutting device 20 includes a guide roller 21, feed roller 22 and a cutter roller 23 opposing to the feed roller 22. The cutting device as a whole is housed in a housing 24 opened at its front side and fixed to the frame of a bed 27, provided with a cover which is foldable to the front side. The guide roller 21 is disposed below the feed roller 22 at such a position as to correctly guide the strands 15a, 15b, 15c coming from the spinning machine 10 to the feed roller 22. The roller 21 is provided with grooves 25a, 25b, 25c which are adapted to limit the paths of running of respective strands, and is movable back and forth in the axial direction thereof in order to vary the positions of running of the strands on the surface of the feed roller 22. The feed roller 22 has a surface made of an elastic material which exhibits a large friction to glass fiber, e.g. rubber or a synthetic resin. The cutter roller opposing to the feed roller 22 has a plurality of blades 26 projecting radially therefrom and adapted to cut into the elastic surface of the feed roller 22 thereby to cut the strands. The cutter roller 23 is adapted to be driven directly and positively by a shaft 33 extending through a housing 32 mounted on the bed 27, while the shaft 33 itself is driven by a motor 28 mounted on the bed 27 through pulleys 29, 30 and a belt 31. The cutter roller 23 is always pressed by fluid pressure means (not shown) against the feed roller 22 which is rotatably held by a shaft extending through the housing on the bed 27, so that the feed roller 22 is driven by the cutter roller 23 through frictional contact and through penetration of the blades 26.

The strands 15a, 15b, 15c of the glass fibers, spun and formed by the spinning machine 10 and still in wetted state, are wound round the feed roller 22 past corresponding grooves 25a, 25b, 25c in the guide roller 21, and are cut at the point of contact between the feed roller 22 and the cutter roller 23 by the blades provided on the cutter roller 23 into pieces of a length which is determined by the pitch of the blades 26. These pieces of strands, i.e. chopped strands 34, are made to drop into the rolling apparatus 40. In this step, the spinning force is derived by adhesion of the wetted strands wound round the surface of the feed roller 22. The molten glass is drawn and spun out from respective spinning furnaces 11a, , 11b, 11c by this spinning force. In consequence, the strands wound round the surface of the feed roller are inevitably flattened. Since such flattened strands are cut into chopped strands 34, the latter naturally have flattened shape. The flattened chopped strands still wet and dropped into the rolling apparatus 40, are subjected to a rolling action effected by the rolling apparatus 40.

The rolling apparatus 40 is disposed below the cutting device 20 at such a position as to be able to receive the chopped strands 34 dropping from the cutting device 20, and is supported by supporting posts 42 through vibration absorbers 41. In the illustrated embodiment, the rolling apparatus 40 is constituted by a vibration box 43, a carrier plate or a spheroidizing plate 44 disposed at a suitable intermediate portion of the vibration box 43 transversely of the latter, the spheroidizing plate 44 being adapted to receive the falling chopped strands 34 and to impact vibration to the chopped strands 34, and a vibration generating device 45 fixed to the side wall of the vibration box 43 and adapted to vibrate the whole part of the vibration box 43. The vibration generating device 45, which is supported by the bottom of the vibration box 45 as stated above, may be of known type such as electromagnetic vibration generating device incorporating an electromagnet which produces a translational reciprocating motion of springs or a mechanical vibration generating device which generates vibration by rotation of unbalanced mass or the like.

The vibration box 43 is opened at its upper end for receiving chopped strands 34 coming from the cutting device 20, and is provided at a portion of side wall thereof with an opening 46 having a bottom flush with the spheroidizing plate 44. The chopped strands 34, which have been subjected to the vibration, are transferred to a drying station through the opening 46, directly or indirectly by means of a suitable transfer device. In this rolling apparatus 40, the spheroidizing plate 44 may be disposed horizontally or at a slight upward or downward inclination towards the opening 46. It is possible to effect sufficiently strong rolling action to the chopped strands and to discharge the treated chopped strands through the opening 46 even if the spheroidizing plate is inclined, provided that adequate vibration is imparted to the spheroidizing plate. The spheroidizing plate 44 itself may constitute the bottom plate of the vibration box 43.

The chopped strands 34 formed by the cutting device 20 drop onto the spheroidizing plate 44 and are subjected to a rolling action caused by the vibration of the spheroidizing plate 44. It is essential that the chopped strands 34 subjected to the rolling action are wetted. It is not possible to generally determine the degree of wetness because the desirable degree of wetness varies depending on various factors such as the kind of the rolling means, strength of the rolling action, unity of the chopped strands and so forth, but the water content preferably ranges between about 5 and 25 wt % and more preferably about 10 and 15 wt %. It is not always necessary that each chopped strand is wetted uniformly to its core, but the chopped strand may be wetted only at the surface region thereof.

In the case of the direct cut type system as in the illustrated embodiment, the chopped strand usually contains 10 to 15 wt % of water and is wetted to the core thereof, so that the chopped strands may be suitably subjected to the rolling action. If the wetness is too small, it is possible to wet the chopped strands by, for example, spraying water onto the chopped strands. In FIG. 1, a reference numeral 47 designates a spray device for spraying water onto the chopped strands. To the contrary, if the water content of the chopped strands is excessively large, it is possible to take, for example, such a measure to introduce hot air into the vibration box 43 thereby to effect the rolling while evaporating a part of the water.

In the above-described rolling treatment, the strength of the rolling action cannot be definitely nor generally determined partly because it varies, even in the illustrated vibration system solely, depending on various factors such as the size of the chopped strands, quantity and nature of the chopped strands, e.g. water content and degree of unity, and partly because the rolling treatment itself can be carried out in various manners as will be explained later. The optimum condition, however, can easily be attained in each rolling system, by effecting the treatment while observing the state of the product. In the case of the illustrated embodiment, the optimum condition is as follows. Namely, three strands each consisting of 2,000 glass filaments having a diameter of 13 $\mu$ and containing 12 wt % of water, are cut directly at a length of 1.5 mm by a cooperation between a feed roller which rotates at a peripheral speed of 1,000 m/min and a cutter roller pressed against the feed roller. The thus formed chopped strands are received by a spheroidizing plate of 0.4 m wide and is made to travel therealong over a distance of 1.2 m while the plate is vibrated at a frequency of 3,000 Hz and amplitude of 4 mm.

Figure 5:
FIG. 5 is a perspective view of a piece of chopped strand which is obtained by imparting a rolling action to the flattened chopped strand shown in FIG. 4; and which is exaggeratedly shown.
Figure 4:
FIG. 4 is a perspective view of a piece of flattened chopped strand which is exaggeratedly shown.

As the chopped strands are treated in wetted state by the rolling action caused by vibration, a kind of spheroidizing effect is imparted to each piece of the chopped strands so that it is gradually rounded and compacted to change its shape from the flattened shape shown in FIG. 4 to substantially rod-like shape shown in FIG. 5. It is thus possible to obtain compacted chopped strand having reduced nap and large bulk specific gravity. The compacted chopped strands thus produced are then dried. The rod-like shape and high density are maintained to the last. One of the features of this chopped strand resides in an extremely small rate of separation of filaments or strand. This remarkable effect may be attributed to the fact that, although regular chopped strands do not adhere to each other, separated filaments or strands have a tendency to stick to each other or to the regular chopped strands to be united and compacted therewith.

According to the invention, it is possible to use a spheroidizing machine as the rolling apparatus. Namely, various spheroidizing machines other than the described vibration type, e.g. rotary vessel type, fluidized bed type, mixer type and so forth, are usable solely or in combination. It is also possible to use apparatus of rotary drum type, rotary disc type and waveform vibration type. In the present specification, therefore, the term "rolling" is used to generally means an action which spheroidize a material by vibration, rotation or flowing, as in the field of spheroidizing technic.

Although it is preferred to supply the chopped strands produced by the cutter directly to the rolling apparatus as in the illustrated embodiment, it is possible to temporarily receive the cut chopped strands by a hopper, inclined conduit or a conveyor and then supply the same to the rolling apparatus. Such an indirect supply of the material is particularly effective when the rolling apparatus is of a rotary drum type.

Although the described embodiment is applied to a direct cut type system, the invention can equally be applied to other types of systems for producing chopped strands. For instance, the strands of undried cake taken up on a bobbin are cut directly or after effecting a coating treatment or wetting treatment by water with or without a sizing agent. It is also possible to subject a so-called dried cake, which has been taken-up on a bobbin and then dried, to a secondary wetting-/coating treatment or to a mere wetting treatment before the cutting. It is yet possible to cut wet directly-wound strand or roving directly or to subject dried directly-wound or roving to the cutting after wetting. In view of the principle of the invention, it will be understood that the invention can be applied even to the dried chopped strands which have not been subjected to the rolling, i.e. to the chopped strands which are produced by the conventional method. To this end, the chopped strands produced by a conventional method are supplied to the rolling apparatus after suitably wetted by water or the dried chopped strand product is supplied to the rolling apparatus under the spray of water.

Preferably, the cutting and rolling apparatus consisting of the cutting device 20 and the rolling device 40 disposed immediately under the cutting device, particularly the cutting and rolling apparatus in the direct-cut type system, is provided at its portion between the cutting device 20 and the rolling apparatus 40 with means for collecting and removing inferior unacceptable chopped strands.

In the illustrated embodiment, there is provided collecting and removing device 50 having a generally box-shaped construction and supported by and fixed to the frame of the bed 27. The collecting and removing device 50 includes a collecting plate 51 which is rotatable between an upright position and a substantially horizontal position capable of interrupting the downward flow of the chopped strands to collect the latter, a handle 52 for rotating the collecting plate 51, and a discharge passage 53. The arrangement is such that, after the collection of the chopped strands, the collecting plate 51 is rotated preferably from the horizontal position to a substantially vertical position or to the original upright position beyond the vertical position so that the collected chopped strands are discharged through the discharge passage 53. The box-type collecting and removing device 50 may be formed as a unit with the peripheral wall 24 of the cutting device 20. In such a case, the discharge passage 53 is connected to an opening formed in the peripheral wall 24. In the illustrated embodiment, the device 50 is connected at its bottom end to the vibration box 43 of the rolling apparatus 40 through an enclosing wall 54 made of a flexible material such as cloth. It is essential that the upper and lower ends of the device 50 is opened at least partly to permit the chopped strands substantially perfectly therethrough. The collecting plate 51 is adapted to be rotated to the position for closing the upper end opening of the device 50 when any unacceptable chopped strands are produced thereby to collect the latter.

The unacceptable chopped strands are produced, when the spinning and cutting are started or restarted after a failure of stranding due to breakage of filaments in a part or whole of the bushings, during spinning and cutting operation. Namely, at the time of starting or restarting of the spinning and cutting, e.g. at the time of restarting, broken filaments are pulled out of the bushings and arranged in the form of strand and then introduced to the feed roller. It is, however, extremely dangerous and practically impossible to directly introduce the filaments to the feed roller because the latter is rotating at a high speed of, for example, about 1,000 m/min. To obviate this danger, it is necessary to lower the rotation speed of the feed roller to a low speed of, for example, 100 m/min. Due to the reduced speed of the feed roller, the strand formed in this state inevitably has an unacceptably large diameter and, hence, the chopped strands become unacceptable as the product. In such a case, the collecting plate 51 is rotated by the handle 52 to the position for closing the chopped strand passage opening of the collecting and removing device 50 thereby to collect the unacceptable chopped strands. Meanwhile, the cover of the housing 24 is folded to open the front side of the housing, and the filaments pulled out and arrayed again are wound round the feed roller 22 via the guide roller 21 and then the cutting is commenced. Thereafter, the speed of the cutter is gradually increased and, after the spinning and cutting speed has reached the normal speed to permit the production of normal acceptable chopped strands, the housing 24 is closed and the collecting plate 51 is rotated so that the unacceptable chopped strands collected by the collecting plate are discharged through the discharge passage 53 to the outside of the apparatus, thus resuming the ordinary state of operation. The collecting and removing apparatus 50 may be operated manually as described or, alternatively, driven by a motor. In the latter case, the collecting plate 51 may be operated automatically in relation to the spinning failure.

The chopped strands thus treated by rolling action are then dried to become final product. The drying may be effected by ordinary measure such as stationary drying making use of hot air or high-frequency-wave heating. The chopped strands produced by the method of the invention, however, can be most efficiently dried by applying hot air to the flowing bed of the chopped strands under vibration, through a number of small apertures opening to the lower side of the flowing bed, such that the hot air flows through the thickness of the flowing bed.

The illustrated embodiment incorporates a drying device 60 which is constituted by a main body or casing 61, a carrier plate or a perforated flow settling plate 62 extending transversely of the casing, a vibration generating device 63 attached to one of the side walls of the casing 61 and adapted to vibrate the casing 61, and an air supplying system and an air discharging system.

The space in the casing 61 is divided by the perforated plate 62 into a lower section constituting a hot air supplying chamber 64 and an upper section which constitutes an air discharging chamber 65. The casing 61 is supported at the bottom wall of the air supplying chamber 64 thereof by means of supporting pillars 67 through vibration absorbers 66. A duct 81 leading from the air supplying system is connected to the opening 68 formed in one side wall of the air supplying chamber 64 so that the hot air is introduced into the latter through the opening 68. The hot air thus supplied is discharged through small perforations formed in the carrier plate 62 and then flows through the bed of the chopped strands 34 on the plate 62 thereby to heat and dry the chopped strands. The dried chopped strands are then continuously taken out through the outlet. The chopped strands may then be sorted and naturally cooled to become the product. The natural cooling, however, is not exclusive and chopped strands the temperature of which is as high as 100° to 110° C. may be cooled forcibly. To this end, in the illustrated embodiment, the outlet-side end portion of the air supplying chamber 64 is sectioned by a partition wall 69 to form a cooling air chamber 70. A duct 88 leading from a cooling blower 87 is connected to an opening 71 formed in one side wall of the cooling air chamber 70. The cooling air supplied through the opening 71 is discharged through the perforation in the plate 62. The air discharging chamber 65 has a chopped strand outlet 72 which extends with a small cross-sectional area at the lower end of front wall of the casing and a discharge opening 73 provided at the top portion of the casing 61 and connected to a discharge duct 84. In this embodiment, the drying device 60 is constructed as a unit with the rolling apparatus by being connected at the side walls thereof to the casing 61 by means of peripheral walls 74 and 75 which are flexible permit the casing 61 and the vibration box 43 to vibrate independently of each other.

The carrier plate 62, which is held transversely in the casing 61, is provided with a plurality of small perforations of a diameter ranging between 1 and 5 mm, preferably between 2 and 3 mm, at a porosity of 1.5 to 10%, preferably 2 to 3%, for passing the hot air and cold air coming from the air supplying chambers 64 and 70, respectively. This plate 62 is disposed at a level slightly below the opening 46 of the rolling apparatus 40 with its end closer to the opening 46 bent upwardly, and is held within the casing 61 substantially horizontally or at a slight inclination towards the chopped strand outlet 72. On the other hand, the spheroidizing plate 44 of the rolling apparatus 40 extends through the opening 46 into the drying device 60 so as to lap the plate 62 over a predetermined area, so that the wetted chopped strand treated by the rolling apparatus 40 are made to drop onto the plate 62 under vibration. Although in the illustrated embodiment the spheroidizing plate 44 has an end bent downwardly and extending into the drying apparatus, this is not exclusive and the end of the spheroidizing plate 44 may be extended horizontally. The vibration generating device 63 may be constituted by the device explained before in connection with the rolling apparatus.

The air supplying and discharging systems of the drying device 60 is constituted by hot air supplying and discharging systems and a cold air supplying system. The hot air supplying and discharging systems include a hot air charging system composed of an air supplying blower 80, duct 81 leading from the blower 80 and connected to the opening 68 of the air supplying chamber 64 and a heater 82 disposed at an intermediate portion of the duct 81, and a discharge system which is composed of a duct 84 connected between the discharge opening 73 of the discharging chamber 65 and the discharge blower 83, a recycling duct leading from the outlet side of the discharging blower 83 to the air supplying blower 80, and an ordinary dust collecting device 86 such as a cyclone disposed at an intermediate portion of the recycling duct 85. On the other hand, the cold air supplying system includes the cooling blower 87 and a duct leading from the blower 87 to the opening 71 in the cooling air supplying chamber 70. The system for discharging the cold air is common to the hot air discharging system. Although not shown, the connections between the ducts 81, 84 and 88 and the openings 68, 73 and 71 are made through canvas ducts which are fixed by flanges at their ends, so that the vibration of the drying device 6 is absorbed by these canvas ducts.

The air discharged from the air supplying blower 80 is heated by the heater 82, and is introduced into the hot air supplying chamber 64 through the duct 81 and is jetted into the discharge chamber 65 through the perforations in the plate 62 as indicated by arrows while heating the latter. The hot air coming into the hot air supplying chamber 64 usually has a temperature ranging between 120° C. and 180° C., preferably between 140° and 150° C., and the flow rate of this air is adjusted to generally provide a flow velocity of 3 to 12 m/sec, preferably 5 to 8 m/sec through each perforation, although the flow rate may be varied depending on various factors such as rate of supply of chopped strands into the drying device, water content of the chopped strands, size of the plate 62, size and porosity of the apertures and so forth. On the other hand, the cold air introduced into the cold air supplying chamber 70 may be the air of room temperature, and the flow rate of this air is adjusted generally to provide a flow velocity of 4 to 6 m/sec for each perforation.

The wetted chopped strands supplied through the opening 46 into the rolling apparatus 40 fall onto the carrier plate 62 which is vibrating, for instance, at a frequency of 1450 Hz and amplitude of 2 mm, and are moved toward the outlet 72 in the form of laminar bed in which the chopped strands are stirred and mixed by the action of the hot air jetted from the perforation in the plate. The chopped strands constituting the moving bed are dried by the hot air which flows through this bed of the chopped strands. At the same time, the flow of hot air blows and carries away the separated fine filaments and strands freed from the chopped strands, and such separated filaments and strands are sucked and removed through the duct 84 together with the hot air. An experiment showed that the quantity of filaments and strands removed by the collecting and removing apparatus 86 generally amounts to 0.5 to 2 wt % in dried state of the total amount of chopped strands introduced into the drying device 60, and that, under such a condition, the dried product of the compacted chopped strands of the invention does not contain at all fine separated filaments and strands which would deteriorate the process characteristics and formability.

The dried chopped strands has a temperature which generally ranges between 100° and 110° C. and may be cooled naturally. Preferably, however, the chopped strands are cooled forcibly. In the illustrated embodiment, the forcible cooling of the chopped strands is achieved by supplying cold air or air of room temperature from the cooling blower 87 through the duct 88 into the cooling air supplying chamber 70 which is formed by sectioning the front-side end of the hot air supplying chamber 64 and jetting this air through the perforation in the carrier plate 62 thereby to positively carry away the heat to cool the chopped strands. The hot air and the cold air supplied from the hot air supplying chamber 64 and cold air supplying chamber 70 and discharged to the discharging chamber 65 past the perforations in the plate 62 while drying and heating the chopped strands, respectively, are induced by the blower 83 through the discharging duct 84 so that the separated filaments and strands are removed by the dust collecting device 86 provided at an intermediate portion of the duct 84. Thereafter, the air devoid of the separated filaments and strands is recycled through the recycling duct 85 to the blower 80 and is then recycled to the drying device as the drying air.

The chopped strands thus dried and then cooled are made to drop onto a sorter 90 from the outlet 72 of the drying device 60, and any residual free filaments and strands, as well as mis-cut strands and other foreign matters, are removed from the chopped strands. The chopped strands are then conveyed through a metal removing device 91 and packed into the final product 92, while the scraps and foreign matters separated and removed by the sorter 90 are wasted from a discharge opening 93.

In the conventional stationary type drying system for chopped strands, it took considerably long time, e.g. 15 hours, for drying the chopped strands. Also, there was a fear that a migration of the sizing agent takes place during the drying. According to the above-described drying system of the invention, however, it is possible to attain a uniform drying in a short period of 15 to 30 minutes without any fear of migration of the sizing agent, while getting rid of separated filaments and strands. It is thus possible to obtain chopped strand product of a high quality.

A preferred embodiment of the invention has been described mainly with reference to a direct cut type production system. According to the method and apparatus of the invention, it is possible to produce chopped strands which are dried suitably particularly by the described dynamic drying device which offers a high drying efficiency as stated before. In addition, the chopped strands as the product exhibits a remarkably reduced content of separated filaments and strands, as well as much reduced naps, and have a high density and substantially rounded rod-like shape rather than flattened shape to well meet the current requirements for rationalization and systematization, as well as formability.

The result of production of chopped strands in accordance with the invention will be shown below as example 1.

EXAMPLE I

Three strands were spun out from three bushings each having cooling fins and 2,000 tip nozzles, and were applied with an ordinary sizing agent containing a coating agent and a lubricant. These three strands were introduced via a guide roller into the cutter which is constituted by a cutter roller having radial blades provided on the periphery thereof at a circumferential pitch of 1.5 mm and a feed roller to which the cutter roller is pressed. The cutting was conducted while rotating the feed roller at a peripheral speed of 1,000 m/min. The chopped strands thus formed exhibited a flattened construction and had a water content of about 12%.

The wetted chopped strands thus obtained were directly dropped into a vibration box which is disposed immediately under the cutter, and was treated by vibration caused by the spheroidizing plate which is disposed transversely in the vibration box. The width and length of the spheroidizing plate was 0.4 m and 1.2 m. The frequency and amplitude of the vibration were 3,000 Hz and 4 mm, respectively. As a result of the vibration treatment, the flatness of the chopped strands was gradually lost and the chopped strands were formed into a rounded rod-like shape. The wetted chopped strands thus treated by vibration were then put into the drying device having a perforated flow settling plate disposed transversely thereof and defining at its upper and lower sides, respectively, an air supplying chamber and an air discharging chamber, under the vibrating condition of a frequency of 1450 Hz and amplitude of 2 mm. Hot air of 150° C. introduced into the air supplying chamber was jetted upwardly through each perforation of the perforated flow settling plate at a velocity of 7 m/sec to dry the chopped strands while the latter were conveyed towards the outlet of the drying device. The perforated flow settling plate had a width of 0.45 m and a length of 3.2 m, and had small perforations of 2 mm dia. at a porosity of 3%. The period of stay of the chopped strands in the drying device was about 30 min. Then, the dried chopped strands were left and cooled naturally to become the final product.

Table 1 shows the quality of the thus produced chopped strands in comparison with chopped strands produced by a conventional method. The conventional method employed in this comparison was to directly dry the chopped strands stationarily by hot air of 130° C., without subjecting the same to the rolling treatment.

In Table 1, the bulk specific gravity was measured by putting 200 g of chopped strands uniformly into a graduated measurement cylinder of 1,000 ml and reading the volume in terms of $g/cm^3$. According to the experience, the greater the bulk specific gravity can be regarded as an index of smaller napping and higher density of the chopped strands.

The fluidity value is determined as follows. Putting 500 g of chopped strands into a pyramid-shaped hopper having an inlet opening of 20 cm square, an outlet of 2.5 cm square and a height of 15 cm, and the outlet of the hopper was opened under vibration at a frequency of 3,000 Hz and an amplitude of 2 mm as measured at the hopper inlet. Then the time length required for the discharge of all chopped strands was measured and determined as the fluidity value (sec/500 g). The smaller fluidity value provides reduced napping and higher density of the product.

The ratio of generation of nap was measured as follows. 60 g of resin pellets of 3.5 mm dia. and 3 mm long was put in a beaker of 1,000 ml together with 40 g of chopped strands and the beaker was sealed and shaken for 3,000 cycles to mix the resin pellets and the chopped strands. Then, the amount of split or fibrillation of the chopped strands was measured by sieving the mixture by means of a sieve of 16 meshes and determining the ratio (%) of the fibrillated fiber left on the sieve to the total quantity of the chopped strands initially put on the sieve. This ratio was used as the ratio of generation of nap. This ratio is used as an index of resistance of the chopped strands to the external mechanical force. Namely, the smaller the ratio is, the greater the convergence and unity of the chopped strands become.

The ratio of residual strands is measured as follows. While dropping the chopped strands from the hopper, air is blown from the lateral side to separate and blow off fine filaments and strands, and the ratio (%) of the thus separated filaments and strands to the initial weight of the strands was measured and used as the ratio of residual strands. Thus, the smaller value this ratio takes, the smaller the fibrillation becomes.

TABLE 1

| | Characteristics of chopped strand | |
|---|---|---|
| | invention | prior art |
| bulk specific gravity ($g/cm^3$) | 0.85 | 0.60 |
| fluidity value (sec/500 g) | 5 | 30 |
| ratio of generation of nap (%) | 3 | 12 |
| ratio of residual strand (%) | 0.01 | 0.50 |

From the comparison made in Table 1 above, it will be seen that the chopped strands produced in accordance with the invention exhibits an extremely small napping and fibrillation and also superior convergence and unity, as well as high density and high resistance to external mechanical force, thanks to the rolling treatment in accordance with the invention.

In the first embodiment described hereinbefore, the rolling treatment and the drying of the chopped strands are conducted in separate steps but these two steps may be carried out in a single apparatus.

Figure 8:
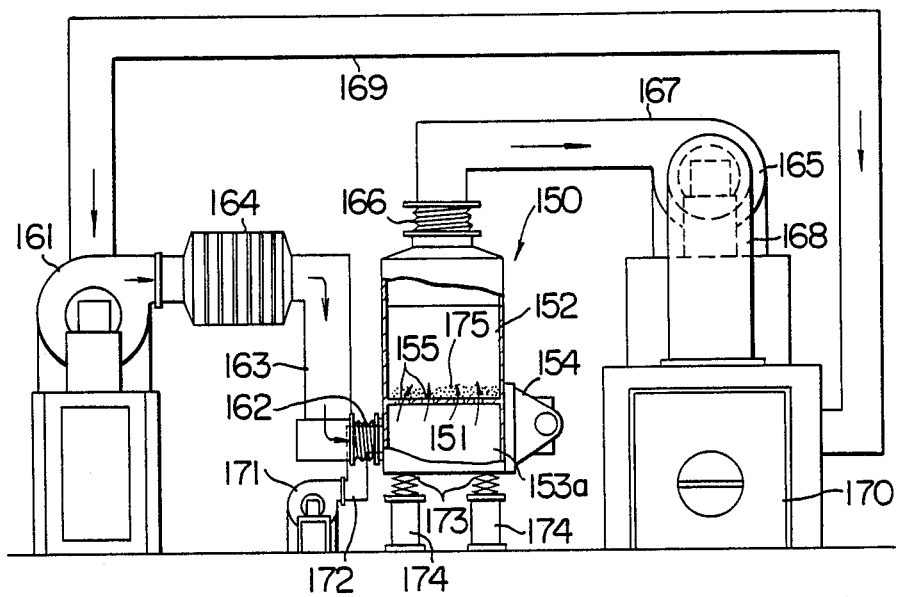
FIG. 8 is a partly-sectioned side elevational view of the spheroidizing and drying apparatus and air supplying and discharging systems annexed thereto.

FIGS. 6 to 8 show an apparatus for producing chopped strand incorporating a spheroidizing and drying apparatus capable of simultaneously effecting the rolling action and drying on the chopped strands.

Referring to these Figures, a reference numeral 110 denotes a spinning machine having bushings 111a, 111b and 111c from each of which spun are a multiplicity of filaments 112a, 112b and 112c to which applied is a binder by means of sizing applicators 113a, 113b and 113c. The groups of filaments are then bound into independent strands 115a, 115b, 115c by means of gathering shoes 114a, 114b and 114c and are then introduced into a cutter 120.

The cutter 120 has a guide roller 121 having grooves of a number corresponding to the number of the strands, a freely rotatable feed roller 122 having a surface made of an elastic material having a large friction coefficient with respect to glass fibers, e.g. rubber or a synthetic resin, and a cutter roller 123 resiliently pressed against the feed roller 122 and driven positively by a motor, the cutter roller 123 having a multiplicity of blades projecting radially therefrom. The wetted strands 115a, 115b and 115c introduced into the cutter 120 are wound round the feed roller 122 past the groove of the guide roller 121 and are cut at the point of contact between the feed roller 122 and the cutter roller 123, into pieces, i.e. chopped strands 130, of a length which is determined by the circumferential pitch of the blades, by the penetration of these blades into the elastic surface of the feed roller. The wetness of the chopped strands 130 thus formed varies depending on the rate of application of binder during the spinning but the water content generally ranges between about 10 and 15 wt %.

In the spinning step and direct cutting step stated above, the spinning force is derived from the adhesion between the strands 115a, 115b, 115c and the surface of the feed roller 122 on the surface of which the strands are closely wound in wetted state. By this spinning force, the groups of glass filaments 112a, 112b, 112c are taken out from the bushings 111a, 111b, 111c and formed into fibers.

By adopting the direct cutting system a stated above, the chopped strands 130 can be produced immediately after the spinning. Although the invention is preferably applied to the spheroidizing and drying of chopped strands produced by the direct cutting type method stated above, the invention can be applied to the spheroidizing and drying of chopped strands produced by other methods than mentioned above. For instance, the invention can be applied to the treatment of chopped strands which are produced by forming undried cake strand formed by taking up the spun and bound strands and then supplying the undried cake strands to a cutter for chopping directly or indirectly after subjecting the undried cake strands to a coating treatment or a wetting treatment by an aqueous treating agent with or without a sizing agent. The invention can also be applied to the treatment of chopped strands which are formed by preparing so-called dried cake strands by taking up the strands on a bobbin and supplying the dried cake strands to a cutter for chopping after a secondary coating and wetting treatment or a mere wetting treatment. Although the foregoing description is focussed mainly on strands, it will be clear to those skilled in the art that the invention can be applied to the spheroidizing and drying of chopped strands produced by cutting in wetted state the products formed from strands, e.g. roving including so-called directly-wound roving which is formed by directly during spinning while omitting the roving step. In this specification, such products from the strands will be referred to as "secondary strand products" hereinunder. The water content of the chopped strands or secondary strand products vary depending on the kinds of the strands and secondary strand products, but usually falls within the range of between about 10 and 25 wt %.

The chopped strands 130 formed through cutting by the cutter 120 are made to drop onto suitable conveying means such as conveyor systems 140a, 140b and 140c, and are conveyed to a spheroidizing and drying device 150. The supply of the chopped strands to the spheroidizing and drying device 150 is usually made continuously, although the supply may be made intermittently. The supplied chopped strands are dried and, preferably, cooled and then taken out as the chopped strand product and packed by a packing device 190.

The spheroidizing and drying apparatus 150 has a casing and a single carrier plate or a spheroidizing flow settling plate 151 disposed horizontally within the casing. The space in the casing is divided by the spheroidizing flow settling plate 151 into an air discharging chamber 152 defined at the upper side of the plate 150 and an air supplying chambers 153a, 153b defined at the lower side of the plate 150. A vibration generating device 154 for vibrating the whole part of the spheroidizing drying device is attached to one of the side walls of the casing. The spheroidizing and drying device further includes, as auxiliary systems, an air supplying and discharging systems connected to the air supplying chambers 153a, 153b and the air discharging chamber 152.

In this spheroidizing and drying apparatus 150, the spheroidizing flow settling plate 151 has a non-perforated region A constituting the region for vibration spheroidizing of the supplied wetted chopped strands, and perforated regions B and C continuous with the non-perforated region and constituting the region for drying and cooling of the chopped strands which flows in the form of a bed from the non-perforated region A. The perforated regions B and C have a multiplicity of through holes 155 of a diameter ranging between 1 and 5 mm, preferably 2 and 3 mm, distributed at a porosity of about 1.5 to 10%, preferably 2 to 3%. This spheroidizing flow settling plate 151 is disposed within the casing horizontally or at a slight inclination towards the outlet.

The air discharging chamber 152 is provided in its wall with an inlet opening 156 for supplying wetted chopped strands to the end of the non-perforated region and a chopped strand outlet opening 157 formed in the end thereof opposite to the opening 156 at a level for permitting the chopped strands, which flows on the spheroidizing flow settling plate 151, to be discharged therethrough. The air discharging chamber is further provided with an air discharging opening 158 for relieving air supplied into this chamber. The air discharging opening 158 is connected to an external air discharging system.

It is preferred that the air supplying chamber is divided by a partition plate 159 into a hot air chamber 153a adjacent to the rear end wall, i.e. the end wall having the chopped strand inlet opening 156, and a cold air chamber 153b adjacent to the front end wall, i.e. the end wall having the chopped stand outlet opening 157, as in the illustrated embodiment. The cold air chamber 153b, however, may be dispensed with provided that the chopped strands heated to a high temperature by the hot air applied through the holes in the spheroidizing flow settling plate 151 are allowed to be cooled naturally. Each of the air supplying chamber 153a and 153b may be further divided into a plurality of sections, although single chambers are sufficient in most cases. Although in the illustrated embodiment, both air supplying chambers 153a and 153b are separated from each other by the partition plate 159. The use of such a partition plate, however, is not essential and these chambers are formed separately from each other from the beginning. The air supplying chambers 153a and 153b are provided in the side wall or bottom wall thereof with air supplying openings 160a and 160b, respectively, which are communicated with a hot air supplying system and a cold air supplying system. When each air supplying chamber has an ample volume or when the same is divided into sections, the opening 160a or 160b may be formed in plural and air supplying pipes branching from corresponding air supplying system are connected to these openings.

The vibration generating device 154 is attached to one of the side walls of the drying device, preferably at a lower portion of the side wall, e.g. the portion of the side wall defining the air supplying chamber, and is adapted to vibrate the apparatus 150 as a whole. The vibration generating device 154 may be of known type such as electromagnetic vibration generating device incorporating an electromagnet adapted to produce parallel reciprocating motions of springs and a mechanical vibration generating device adapted to generate vibration by a rotary motion of an unbalanced mass.

The air supplying and discharging systems include an air supplying system and an air discharging system for hot air and an air supplying system for cold air. More specifically, the air supplying system for hot air includes a blower 161 for supplying air, a duct 163 connected between the blower 161 and the opening 160a of the air supplying chamber 153a through vibration absorbing canvas ducts 162 and provided with a flow-rate adjusting damper (not shown) and a heater 164 disposed at an intermediate portion of the duct 163 and adapted to heat the air from the blower 161 up to a desired high temperature. The air discharge system for hot air includes an air discharging blower 165, a duct 167 connected between the air discharge opening 158 of the air discharging chamber 152 and the air discharging blower 165 through canvas ducts 166 and having a flow-rate adjusting damper (not shown), and an air discharging duct 168 leading from the air discharging blower 165. Preferably, the air supplying system and the air discharging system are connected to each other through a recycling duct 169 so that the hot air supplied from the hot air supplying system into the air supplying chamber 152 is induced by the air discharging blower 165 and recycled to the hot air supplying system through the recycling duct 169. Such a recycling system can be formed by, for example, connecting the air discharging duct 168 to a dust collecting device 170 such as a cyclone and extending the recycling duct 169 from the dust collecting device 170 and connecting the same to the suction side of the air supplying blower 161. In the preferred form having the air supplying chamber 153b for the cooling air, the air supplying system connected to this chamber 153b is constituted by an air supplying blower 171 and a duct 172 connected between the blower 171 and the opening 160b of the air supplying chamber 153b through canvas ducts (not shown) and provided with a flow-rate adjusting damper which is not shown. It is not necessary to form an independent discharge system for the cooling air. Namely, as in the case of the illustrated embodiment, the air systems for hot air and cold air make common use of the discharging chamber 152. Namely, the discharging chamber 152 for hot air is used not only as the discharging chamber for hot air but also as a discharging chamber of cold air.

The spheroidizing and drying apparatus 150 is resiliently supported at the bottom walls of the air supplying chambers 153a, 153b thereof through vibration absorbers such as springs 173 by supporting pillars 174 standing upright from the floor, so that the apparatus as a whole is vibrated by the vibration generating device 154.

Masses of chopped strands 130 conveyed by the conveyor systems 140a, 140b, 140c and supplied into the spheroidizing and drying apparatus 150 continuously or intermittently are made to drop onto the non-perforated region A of the spheroidizing flow settling plate 151 which is being vibrated by the action of the vibration generating device 154 and the chopped strands are moved towards the perforated region B in the form of laminar bed while jumping as a result of the vibration. In the perforated region B, the chopped strands 130 form a substantially fluidized bed 175 by the action of the vibration and the hot air jetted from the multiplicity of perforations and are naturally moved continuously towards the outlet opening 157.

The chopped strands 130 supplied to the spheroidizing flow settling plate 151 is subjected to a rolling action caused by the vibration while they pass through the non-perforated region A. It is essential that the chopped strands are subjected to this rolling action while they are in wetted state. The degree of wetness cannot be determined definitely because the preferred degree of wetness varies depending on various factors such as degree of unity of the chopped strands. The water content of the chopped strands, however, generally ranges between about 5 and 25 wt % and preferably between about 10 and 15 wt %. It is not always necessary that each chopped strand is wetted uniformly nor perfectly to its core portion. Namely, the chopped strand may be wetted only in its surface region. In the direct-cut type system of the illustrated embodiment, the strand is usually wetted to its core and has a water content generally ranging between 10 and 15 wt % so that the chopped strands can suitably be subjected to the rolling action caused by vibration. In the event that the water content is too small, however, water is added to the chopped strands by, for example, spraying.

As the chopped strands in the wetted state are subjected to the rolling action caused by vibration, a kind of spheroidizing is effected on the chopped strands while preventing the same from sticking nor bonding to one another. In consequence, the chopped strands are gradually rounded to change its form from the flattened shape shown in FIG. 4 to a substantially rod-like shape a shown in FIG. 5. The spheroidized and compacted wetted chopped strands are then dried but each chopped strand maintains its rod-like shape to the last and finally becomes a compacted chopped strand having reduced nap and high bulk specific weight. The length of the non-perforated region A of the spheroidizing flow settling plate 151 constituting the rolling spheroidizing region varies depending on the high density or compactness to be achieved, but generally falls within the region of between 1 and 2 m.

The wetted chopped strands spheroidized and compacted in the non-perforated region A, forming a flowing bed, are moved towards the perforated region B where the chopped strands form a substantially fluidized bed 175 by the action of the hot air applied through the through holes 155 while being vibrated, so that the chopped strands are dried and naturally moved toward the outlet 157. In order to achieve the desired spheroidizing and compacting of the chopped strands, as well as settling of flowing bed and smooth convey of the chopped strands, the spheroidizing flow settling plate 151 is vibrated at a frequency generally ranging between about 500 and 3,000 Hz, preferably between about 1,000 and 2,000 Hz, and an amplitude of several millimeter, e.g. 1.5 to 3.0 mm. Depending on the variation of factors such as rate of supply of the chopped strands, water content of the chopped strands, rate of supply of the drying air and so forth, it is possible to attain effective spheroidizing and compacting, as well as smooth convey, of the chopped strands. Namely, according to the described vibrating method, the separation of the chopped strands from one another are promoted partly because the chopped strands receive jetting action of the drying air while being vibrated and partly because the stickiness of the chopped strands is reduced due to the rapid evaporation of water attributable to the application of drying air. In consequence, the undesirable formation of large lump during the convey is avoided and the chopped strands are smoothly conveyed while forming a laminar flowing bed.

The heating air for drying the wetted chopped strands conveyed from the non-perforated region A to the perforated region B is obtained by heating the air supplied by the air supplying blower 161 up to a desired temperature. The heated air is introduced through the duct 163 into the air supplying chamber 153a and, while heating the spheroidizing flow settling plate 151, discharged through the small perforations 155 in the perforated region B into the air discharging chamber 152 through the flowing bed of the chopped strands thereby to promote the formation of the fluidized bed 175. The jetting action of the heated air causes a rapid evaporation of considerable part of the water content possessed by the chopped strands when the latter are introduced to the perforated region to promote the separation of chopped strands into independent strands, and, hence, serve to the formation of the laminar fluidized bed 175. The chopped strands in the bed 175 are not necessarily perfectly floated by the action of the heated air but are sufficiently stirred and mixed to uniformalize the flowing bed to further promote the drying. The thickness of the bed generally ranges between 0.5 and 3 cm and preferably falls within the range of between 1 and 2 cm.

In order to produce these effects of the heated air, it is necessary to suitably determine the temperature and flow rate of the heated air. The air flow rate and temperature, however, depend on various factors of the perforated region B and the flow rate is further restricted by the requirement for preventing substantial blowing off of the chopped strands forming the flowing bed, so that it is not possible to generally and definitely determine the air flow rate and temperature. The air temperature, however, preferably ranges between 120° and 180° C., more preferably between 140° and 180° C., while the flow rate is selected to provide an air flow velocity of about 3 to 12 m/sec, and more preferably between about 5 and 8 m/sec for each perforation. It is also preferred that the air temperature and flow rate are selected in relation to each other such that the air immediately above the fluidized bed 175, i.e. the air which has just emerged from the bed 175, which naturally has a temperature lower than that before entering the bed 175, exhibits a temperature ranging between about 100° and 110° C. Under such conditions, ordinary wet cut chopped strands and direct cut strands having water content of about 10 to 25% are perfectly dried in 15 to 30 minutes. When the drying is completed in such a short period of time, hitherto, there is a fear that, when a certain kind of curing type binder is used, the binder cannot be cured sufficiently. This fear, however, can be completely eliminated by employing a somewhat higher air temperature and/or using a spheroidizing and drying apparatus having a spheroidizing flow settling plate of a larger length. As has been described, the combination of the vibration and the jetting of heated air facilitates the separation of the chopped strands and the formation of laminar bed of the chopped strands. Therefore, the rate of supply of the heated air can be reduced as compared with system employing no vibration, so that the method of the described embodiment can be applied to the treatment of chopped strands of smaller length, e.g. 1 to 3 mm.

As stated above, the dried chopped strands usually has a temperature higher than 100° C. The hot strands of high temperature may be left for natural cooling as in the conventional method but, in order to fully enjoy the high efficiency of spheroidizing and drying in accordance with the invention, it is preferred to use the cooling air supplying system to forcibly cool the chopped strands in the same manner as the drying.

Namely, cooling air is supplied by the cooling air supplying blower 171 through the duct 172 into the air supplying chamber 153b and is jetted through the small perforations 155 in the perforated region C of the spheroidizing flow settling plate 151. The cooling air jetted from the small perforations 155 is made to flow through the bed 175 of the hot chopped strands moving along the perforated region B of the spheroidizing flow settling plate 151 thereby to remove the heat from the chopped strands and is relieved to the air discharging chamber. The ambient air of room temperature can satisfactorily be used as the cooling air. The flow velocity of the cooling air jetted from the small perforations 155 in the perforated region C may be lower than the flow velocity of the drying air, and may fall between about 1 and 10 m/sec, preferably between about 4 and 6 m/sec. By this dynamic cooling of the chopped strands in the form of a laminar flowing bed, the chopped strands having a temperature above 100° C. are cooled down to the room temperature in short time of 5 to 10 minutes.

In the above-described steps of drying and cooling, the spheroidized and compacted chopped strands keep their unity substantially perfectly even under the application of jets of heating air and cooling air for effecting dynamic drying and cooling. In consequence, as will be realized from the description of an example, the embodiment described hereinbefore provides chopped strands of high bulk specific weight and, hence, high density, without suffering any problem such as migration of the binder, breakage of the binder and so forth, because the stirring and mixing of the chopped strands in the laminar flowing bed shortens the heating time.

As stated before, the drying air and cooling air are jetted from the air supplying chambers 153a and 153b through the small perforations 155 in the spheroidizing flow settling plate 151 and flows into the air discharging chamber 152 across the fluidized bed 175 of the chopped strands to merge in each other. The air is then sucked and discharged by the air discharging blower 165 through the ducts 167 and 168. Preferably, the discharged air is made to pass through a dust collector 170 where freed filaments and strands are removed from the air, and is then recirculated to the air supplying blower 161 and fed into the apparatus as the heating air after passing through the heater 164.

In the drying and cooling steps described above, fine filaments and strands freed from the strands at the time of cutting are collected from the discharged air under normal drying and cooling conditions, at a ratio of 0.5 to 2% of the total amount of supplied chopped strands, although this ratio varies depending on the velocities of the heating air and cooling air. Even if a part of such freed filaments and strands remain in the strand, such fine filaments and strands closely attach to and united with the chopped strands while the wetted strands are rolled in the non-perforated region A, so that such freed filaments and strands do not degrade the quality of the chopped strands as the final product at all. In the conventional method in which the drying air is applied while the chopped strands are kept stationary, the chopped strands as the product can have only a small bulk specific weight. This seems to be attributable to the fact that considerably large part of the freed fine fibers and strands remain attaching to the chopped strands and dried together with the latter to increase the bulkiness. The dried and cooled chopped strands are made to drop from the product outlet opening 157 onto an ordinary sorter 180 where the mis-cut chopped strands and other unacceptable chopped strands are separated as scrap and removed through the discharge opening 181 to a waste vessel 182. The chopped strands now devoid of the scrap is then delivered via a metal chip remover 183 to a product container 184 while being weighed. When a predetermined weight is reached, the chopped strands are fed to a packing device 190, and packed to become final packed product 191.

In the above-described sorting step, the dried and cooled chopped strands do not tend to form lumps partly because the freed filaments and strands are substantially removed by the jet of air and partly because the migration of binder, which is liable to form lump, is substantially eliminated. In consequence, it is possible to obtain a continuous and smooth discharge of the chopped strands substantially at a constant rate.

Figure 9:
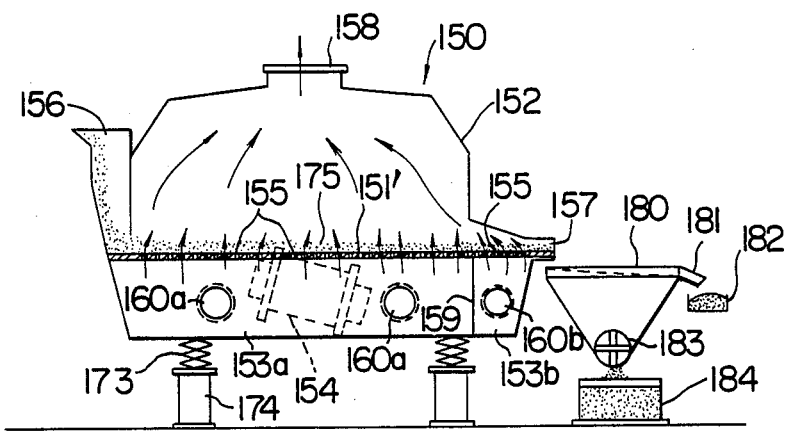
FIG. 9 is a sectional side elevational view of a modification of the spheroidizing and drying apparatus shown in FIG. 7.

The spheroidizing and drying apparatus shown in FIG. 7 has the non-perforated region A adjacent to the strand supplying opening 156. As stated before, the length of this non-perforated region A is determined in accordance with the degree of compacting of chopped strands to be attained and the wetness of the chopped strands supplied thereto. The non-perforated region A may be omitted if the demand for compactness is not so high. FIG. 9 shows a spheroidizing and drying apparatus having a spheroidizing flow settling plate 151' devoid of the non-perforated region A. In this embodiment, therefore, the wetted chopped strands supplied from the supplying opening 156 is directly subjected to rolling and drying actions.

The results of test production of chopped strands by the apparatus shown in FIGS. 6 to 8 and the apparatus shown in FIG. 9 are shown as Examples II and III below.

EXAMPLE II

Glass fibers of 13 $\mu$ were spun out of three bushings each having 800 tip nozzles by an ordinary spinning method under application of two different kinds of urethane binders. The glass fibers were bound into three independent strands by gathering shoes and these three strands were introduced through a guide roller into a cutter which is composed of a cutter roller having a plurality of radial blades projecting from the peripheral surface thereof and a feed roller to which the cutter roller is pressed, so that the strands were cut by the cutter to become chopped strands. The thus obtained wetted chopped strands exhibited a flattened construction and had a water content of 12%. The wetted chopped strands were accumulated on the conveyor disposed just under the cutter and were conveyed to the spheroidizing and drying apparatus of the type shown in FIGS. 7 and 8 in which the spheroidizing, drying and cooling were effected to obtain the final product. The water content of the product was smaller than the normal one, i.e. below 0.03% and it was thus confirmed that the chopped strands have been dried substantially perfectly. The chopped strands as the product also exhibited rounded rod-like shape. The rate of supply of the chopped strands to the spheroidizing and drying apparatus was about 45 Kg/hour, while the thickness of the flowing bed of the chopped strands in the perforated region of the spheroidizing flow settling plate was about 10 to 15 mm under the application of heated air.

In the spheroidizing and drying apparatus used, the spheroidizing flow settling plate had a width of 450 mm and a length of 4,500 mm, and had the spheroidizing non-perforated region of 0.54 $m^2$ (450 mm wide and 1,200 mm long) succeeded by a drying perforated region corresponding to the heated air supplying chamber under the spheroidizing flow settling plate, having an area of 1,125 $m^2$ (450 mm wide and 2,500 mm long). The remainder portion of the spheroidizing flow settling plate constitutes the perforated region for passing the cooling air.

To ensure the safety, this spheroidizing flow settling plate is designed to have a size somewhat greater than the minimum size required for the spheroidizing and drying, and has small perforations of 2 mm dia dispersed in the perforated region thereof uniformly at a porosity of 3%. The spheroidizing flow settling plate was vibrated at a frequency of 1,40 Hz and an amplitude of 2 mm, by the action of the aforementioned mechanical vibration generating device. The spheroidizing and drying apparatus had a hot air supplying system and a cold air supplying system connected to respective air supplying chambers thereof, and an air discharging system having a cyclone and connected to the air discharging chamber thereof. Hot air of 150° C. was used as the heated drying air and was jetted at a flow velocity of 5 m/sec through each small perforation. The cooling air, which was the ambient air of room temperature, also was jetted at the flow velocity of 5 m/sec through each perforation. The spheroidizing time, drying time and the cooling time were about 8 minutes, 17 minutes and 6 minutes.

Table 2 shows the characteristics of the thus produced chopped strands, in comparison with the characteristics of chopped strands which were produced by drying the wetted chopped strands of the same wetness in the form of a stationary bed of 60 mm thick having bulk specific weight of 0.55 to 0.56 g/cm for 10 hours under circulation of hot air of 130° C.

In Table 2, the water contents are the water contents of the chopped strand products which have been spheroidized, dried and then cooled.

The deposition ratio is the ratio by weight of the binder to the fiber in the product chopped strands, while the insolubility is the ratio by weight of the non-dissolved remaining binder to the amount of binder before treatment, when the dried chopped strands with the binder are boiled and dissolved in toluene for 1 hour.

The fluidity value is determined as follows. Putting 100 g of chopped strands into a pyramid-shaped hopper having an entrance of 20 cm square, an exit of 2.5 cm square and 15 cm high, the square exit was opened while imparting a vibration of 3,000 Hz and an amplitude of 2 mm as measured at the entrance. Then, the time length required for the discharge of all chopped strands was measured and determined as the fluidity value in terms of sec/100 g. The smaller the fluidity value is, the lesser the napping. Similarly, smaller fluidity value is an index of high density of the product.

The bulk specific weight was by putting 200 g of chopped strands uniformly into a graduated measurement cylinder of 1,000 ml and reading the volume in terms of g/cm$^3$. According to the experience, the greater bulk specific gravity can be regarded as an index of less napping and higher density of the product.

The ratio of generation of nap was measured as follows. 100 g of chopped strands was put in a beaker of 1,000 ml and the beaker was shaked for 3,000 cycles to mix the chopped strands. The ratio of fibrillation as a result of vibration was measured by sieving the vibrated chopped strands by means of a sieve of 16 meshes, and determining the ratio of the fibrillated strands to the total amount of chopped strands supplied to the sieve. This ratio (%) was used as the index of ratio of generation of nap (CS). The ratio of fibrillation (CS/R) was measured by the same manner as the ratio (CS), except that 40 g of chopped strands was mixed with 60 g of resin pellets each had a length of 3 mm and a diameter of 3.5 mm. These values can be regarded as index of resistance to external mechanical force. Namely, the smaller ratio of generation of nap indicates higher binding and unity of each piece of chopped strand.

TABLE 2

| | characteristics of chopped strands | | | |
|---|---|---|---|---|
| | cut length of chopped strands 3 mm (urethane I system) | | cut length of chopped strands 6 mm (urethane II system) | |
| | invention | stationary method | invention | stationary method |
| water content, (%) | 0.0123 | 0.0119 | 0.0082 | 0.0093 |
| deposition ratio, (%) | 0.52 | 0.51 | 0.52 | 0.49 |
| insolubility, (%) | 59.2 | 58.8 | 23.1 | 22.4 |
| fluidity value, (sec/100 g) | 3.5 | 6.2 | 25 | 34 |
| bulk specific gravity (g/cm$^3$) | 0.80 | 0.77 | 0.72 | 0.61 |
| ratio of generation of nap, (%) | | | | |
| —CS | 0.10 | 0.20 | 2.4 | 3.8 |
| —CS/R | 0.05 | 0.1 | 8.5 | 11.9 |

EXAMPLE III

Glass fibers of 13 μ were spun out of three bushings each having 800 tip nozzles by an ordinary spinning method under application of two different kinds of urethane binders The glass fibers were bound into three independent strands by gathering shoes and these three strands were introduced through a guide roller into a cutter which is composed of a cutter roller having a plurality of radial blades projecting from the peripheral surface thereof and a feed roller to which the cutter roller is pressed, so that the strands were cut by the cutter to become chopped strands. The thus obtained wetted chopped strands had a water content of 12%. The wetted chopped strands were accumulated on the conveyor disposed just under the cutter and were conveyed to the drying apparatus of the type shown in FIG. 9 in which the spheroidizing, drying and cooling were effected to obtain the final product. The water content of the product was smaller than the normal one, i.e. below 0.03% and it was thus confirmed that the chopped strands have been dried substantially perfectly. The rate of supply of the chopped strands to the drying apparatus was about 45 Kg/hour, while the thickness of the fluidized bed of the chopped strands in the perforated region of the perforated flow settling plate was about 10 to 15 mm under the application of heated air.

In the drying apparatus used, the perforated flow settling plate had a width of 450 mm and a length of 3,200 mm, and had the drying region of 1,125 m$^2$ (450 mm wide and 2,500 mm long) corresponding to the heated air supplying chamber under the perforated flow settling plate. The remainder portion of the spheroidizing flow settling plate constitutes the perforated region for passing the cooling air.

To ensure the safety, this spheroidizing flow settling plate is designed to have a size somewhat greater than the minimum size required for the spheroidizing and drying, and has small perforations of 2 mm dia dispersed in the perforated region thereof uniformly at a porosity of 3%. The spheroidizing flow settling plate was vibrated at a frequency of 1.450 Hz and an amplitude of 3 mm, by the action of the aforementioned mechanical vibration generating device. The spheroidizing and drying apparatus had a hot air supplying system and a cold air supplying system connected to respective air supplying chambers thereof, and an air discharging system having a cyclone and connected to the air discharging chamber thereof. Hot air of 150° C. was used as the heated drying air and was jetted at a flow velocity of 5 m/sec through each small perforation. The cooling air, which was the ambient air of room temperature, also was jetted at the flow velocity of 5 m/sec through each perforation. The drying time and the cooling time were about 16 minutes and 5 minutes.

Table 3 shows the characteristics of the thus produced chopped strands, in comparison with the characteristics of chopped strands which were produced by drying the wetted chopped strands of the same wetness in the form of a stationary bed of 60 mm thick having bulk specific weight of 0.55 to 0.56 g/cm for 10 hours under circulation of hot air of 130° C.

In Table 3, the properties such as the water content, ratio of deposition, insolubility, fluidity value, bulk specific weight and ratio of generation of nap are determined in the same way as Table 2.

TABLE 3

| | Characteristics of Chopped Strands | | | |
|---|---|---|---|---|
| | cut length of chopped strands 3 mm (urethane I system) | | cut length of chopped strands 6 mm (urethane II system) | |
| | invention | stationary method | invention | stationary method |
| water content,(%) | 0.0146 | 0.0119 | 0.0123 | 0.0093 |
| deposition ratio, (%) | 0.52 | 0.51 | 0.51 | 0.49 |
| insolubility, (%) | 58.9 | 58.8 | 23.1 | 22.4 |
| fludity value, (sec/100 g) | 4.1 | 6.2 | 27 | 34 |
| bulk specific gravity, (g/cm$^3$) | 0.79 | 0.77 | 0.68 | 0.61 |
| ratio of generation of nap, (%) | | | | |
| −CS | 0.05 | 0.20 | 2.5 | 3.8 |
| −CS/R | 0 | 0.1 | 9.5 | 11.9 |

While preferred embodiments of the invention have been described using specific terms, such description is for illustrative purpose only and it is to be understood that changes and variations may be made without departing from the spirit or scope of the following claims.

What is claimed is:

1. A method of producing compacted chopped strands having a high density comprising: cutting wetted strands with a cutting blade to prepare flattened chopped strands; subjecting said flattened chopped strands in a wetted state to a spheroidizing action until the flattened chopped strands are changed into compacted rod-shaped chopped strands having substantially circular cross-section; supplying said compacted chopped strands to one end of a vibrating carrier plate provided with a multiplicity of small perforations; conveying said chopped strands in the form of flowing bed thereof toward another end of said carrier plate while vibrating said chopped strands; applying heated gas to said flowing bed of chopped strands from the lower side of said carrier plate so that said heated gas flows through said flowing bed, thereby drying said chopped strands and removing fine filaments contained in said flowing bed; recirculating said heated gas which has passed through said flowing bed to the lower side of said carrier plate; and separating fine filaments from said heated gas being recirculated.

2. A method of producing compacted chopped strands having a high density according to claim 1, characterized by further comprising the step of applying a flow of cooling gas to said flowing bed of said chopped strands from the lower side of said flowing bed at a region downstream from the region where said heated gas is applied, said cooling gas flowing through said flowing bed thereby to cool said chopped strands.

3. A method of producing compacted chopped strands having a high density according to claim 1, wherein said flattened chopped strands have a length of preferably 1 to 3 mm.

4. A method of producing compacted chopped strands having a high density according to claim 1, wherein said flattened chopped strands to be subjected to a rolling action are in a wetted state having a water content between 5 and 25 wt. %.

5. A method for producing compacted chopped strands having a high density comprising: cutting wetted strands with a cutting blade to prepare flattened chopped strands; supplying the wetted and flattened chopped strands to one end region of a vibrating carrier plate provided with a multiplicity of small perforations except at said one end region and conveying said chopped strands toward another end region so as to form a vibrating and flowing bed of chopped strands; imparting a spheroidizing action to the bed of chopped strands while they are being conveyed, so that the flattened chopped strands are changed into compacted rod-shaped chopped strands having substantially circular cross-section; supplying a heated gas through the flowing bed of chopped strands from the lower side of said carrier plate to dry said chopped strands and remove fine filaments contained in said flowing bed; recirculating said heated gas which has passed through said flowing bed to the lower side of said carrier plate; and separating fine filaments from said heated gas being recirculated.

6. A method of producing compacted chopped strands having a high density according to claim 5, wherein a cooling gas is applied to said bed of said chopped strands flowing toward said other end on said carrier plate at a region downstream from the region where said heated gas is applied, from the lower side of said bed so as to flow through said bed thereby to cool said chopped strands.

7. A method of producing compacted chopped strands having a high density according to claim 5, wherein said heated gas is supplied to a region of said flowing bed which is spaced by a predetermined distance in the downstream direction from the point to which said wetted chopped strands are supplied.

8. A method of producing compacted chopped strands according to claim 5, wherein said heated gas is supplied to the region of said flowing bed of said chopped strands near the position of supply of the wetted chopped strands.

9. A method of producing compacted chopped strands having a high density according to claim 5, wherein said wetted and flattened chopped strands to be supplied to one end region of the vibrating carrier plate have a water content between 5 and 25 wt. %.

10. An apparatus for producing compacted chopped strands having a high density comprising:
means for cutting wetted strands with a cutting blade so as to form flattened chopped strands;
a rolling apparatus having an inlet for receiving wetted, flattened chopped strands; a spheroidizing means for imparting spheroidizing action to said wetted chopped strands until the flattened chopped strands are changed into compacted rod-shaped chopped strands having substantially circular cross-section; and an outlet for discharging the treated chopped strands;
drying means adapted to receive and dry said chopped strands coming from said rolling means having a casing provided at one end with an inlet for said chopped strands and at the other end an outlet for said chopped strands; a flow settling plate disposed in said casing substantially horizontally between said one end and said other end and provided with a multiplicity of small perforations, said flow settling plate dividing the space in said casing into at least one gas supplying chamber below and a gas discharging chamber above; and a vibrating means for vibrating said flow settling plate such that said chopped strands supplied through said inlet are moved toward said outlet;

means for supplying a heated gas into said gas supplying chamber so that said heated gas flows upwardly through the perforations in said perforated flow settling plate and then through said flowing bed of said chopped strands;

a gas discharging means for discharging gas from said gas discharging chamber;

a gas recirculating means for recirculating heated gas discharged from said gas discharging chamber to said gas supplying chamber; and means provided in said gas recirculating means for separating fine filaments from said heated gas being recirculated.

11. An apparatus for producing compacted chopped strands having a high density according to claim 10, characterized by further comprising a second gas supplying chamber disposed under said perforated flow settling plate and at the downstream side of the first gas supplying chamber as viewed in the direction of flow of said chopped strands; and a cooling gas supplying means for supplying a cooling gas into said second gas chamber such that said cooling gas flows upwardly through said small perforations in said perforated flow settling plate and then through the flowing bed of said chopped strands.

12. An apparatus for producing compacted chopped strands having a high density according to claim 10, wherein said flattened chopped strands have a length of preferably 1 to 3 mm.

13. An apparatus for producing compacted chopped strands having a high density comprising:

means for cutting wetted strands with a cutting blade so as to form flattened chopped strands;

a rolling apparatus having a casing provided at one end with an inlet for receiving said wetted chopped strands and at the other end an outlet for discharging chopped strands; a flow settling plate disposed in said casing substantially horizontally between said one end and said other end and provided with a multiplicity of perforations except at said one end near said inlet, said flow settling plate dividing the space in said casing into at least one gas supplying chamber below and a gas discharging chamber above said flow settling plate; a vibrating means for vibrating said flow settling plate such that said chopped strands supplied through said inlet are moved as a flowing bed toward said outlet along said flow settling plate; and spheroidizing means for imparting spheroidizing action to said flowing bed of wetted chopped strands until the flattened chopped strands are changed into compacted rod-shaped chopped strands having substantially circular cross-section;

means for supplying a heated gas to said gas supplying chamber such that said heated gas flows upwardly through said perforations in the flow settling plate and then through said flowing bed of chopped strands;

a gas discharging means for discharging said gas from said gas discharging chamber;

a gas recirculating means for recirculating heated gas discharged from said gas discharging chamber to said gas supplying chamber; and means provided in said gas recirculating means for separating fine filaments from said heated gas being recirculated.

14. An apparatus for producing compacted chopped strands having a high density according to claim 13 characterized by further comprising: a second gas supplying chamber disposed under said perforated flow settling plate and at the downstream side of the first gas supplying chamber as viewed in the direction of flow of said chopped strands; and a cooling gas supplying means for supplying a cooling gas into said second gas supplying chamber such that said cooling gas flows upwardly through said perforations in said perforated flow settling plate and then through the flowing bed of said chopped strands.

15. An apparatus for producing compacted chopped strands having a high density according to either one of claims 13 and 14, wherein said perforated flow settling plate has a non-perforated region near said inlet, said non-perforated region being adapted to impart mainly said rolling action to said wetted chopped strands moving therethrough thereby to compact said chopped strands.

16. An apparatus for producing compacted chopped strands having a high density according to either one of claims 13 and 14, wherein said perforated plate is provided with said perforations over substantially entire region thereof, whereby said wetted chopped strands supplied thereto are directly dried while being subjected to the rolling action.

* * * * *